(12) United States Patent
Jeong et al.

(10) Patent No.: US 10,817,332 B2
(45) Date of Patent: Oct. 27, 2020

(54) ELECTRONIC DEVICE HAVING MULTI-OPERATING SYSTEM AND METHOD FOR MANAGING DYNAMIC MEMORY FOR SAME

(71) Applicant: SAMSUNG ELECTRONICS CO., LTD., Suwon-si, Gyeonggi-do (KR)

(72) Inventors: Bok-deuk Jeong, Yongin-si (KR); Sung-min Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 347 days.

(21) Appl. No.: 15/774,356

(22) PCT Filed: Jun. 21, 2016

(86) PCT No.: PCT/KR2016/006570
§ 371 (c)(1),
(2) Date: May 8, 2018

(87) PCT Pub. No.: WO2017/082505
PCT Pub. Date: May 18, 2017

(65) Prior Publication Data
US 2020/0249969 A1    Aug. 6, 2020

(30) Foreign Application Priority Data

Nov. 11, 2015   (KR) .......................... 10-2015-0158033

(51) Int. Cl.
*G06F 9/46* (2006.01)
*G06F 9/48* (2006.01)
(Continued)

(52) U.S. Cl.
CPC ............ *G06F 9/4856* (2013.01); *G06F 9/455* (2013.01); *G06F 9/45533* (2013.01);
(Continued)

(58) Field of Classification Search
CPC .... G06F 12/1009; G06F 9/48; G06F 11/2097; G06F 12/1081; G06F 9/45558;
(Continued)

(56) References Cited

U.S. PATENT DOCUMENTS

| | | |
|---|---|---|
| 8,015,383 B2 | 9/2011 | Shultz et al. |
| 8,145,763 B2 | 3/2012 | Waldspurger |

(Continued)

FOREIGN PATENT DOCUMENTS

| | | |
|---|---|---|
| KR | 10-2009-0122936 | 12/2009 |
| KR | 10-2011-0138888 | 12/2011 |
| KR | 10-2015-0097981 | 8/2015 |

OTHER PUBLICATIONS

Hines et al, "Post-Copy Based Live Virtual Machine Migration Using Adaptive Pre-paging and Dynamic Self-Ballooning", VEE'09, Mar. 2009, pp. 1-10 <Self-Ballooning_2009.pdf>.*

(Continued)

*Primary Examiner* — Tuan A Vu
(74) *Attorney, Agent, or Firm* — Nixon & Vanderhye, P.C.

(57) ABSTRACT

The present invention provides a method for managing dynamic memory between a host operating system and a guest operating system in an electronic device for executing a multi-operating system. A method for managing dynamic memory enables, with respect to the available memory state of a host operating system and a guest operating system, direct determination of transmission of guest operating system memory to the host operating system by the guest operating system and recovery of the transmitted memory to the guest operating system and enables a request for execution to the host operating system. Moreover, with respect to memory availability state information of the guest operating system, memory information of the host operating system can be collected at a designated collecting interval by means (Continued)

of a request to the host operating system. Also, the host operating system can allocate dynamic memory of the guest operating system with respect to a request from the guest operating system.

15 Claims, 9 Drawing Sheets

(51) Int. Cl.
    *G06F 9/455* (2018.01)
    *G06F 9/50* (2006.01)
(52) U.S. Cl.
    CPC ...... *G06F 9/45545* (2013.01); *G06F 9/45558* (2013.01); *G06F 9/5016* (2013.01); *G06F 9/5077* (2013.01); *G06F 2009/4557* (2013.01); *G06F 2009/45583* (2013.01); *G06F 2212/151* (2013.01)
(58) Field of Classification Search
    CPC ............... G06F 9/4856; G06F 9/45533; G06F 9/45545; G06F 9/5077; G06F 2009/45583; G06F 2009/4557
    See application file for complete search history.

(56) References Cited

U.S. PATENT DOCUMENTS

| | | |
|---|---|---|
| 8,914,607 B2 | 12/2014 | Choi |
| 8,935,506 B1* | 1/2015 | Gopalan ............ G06F 12/1009 711/202 |
| 2009/0006801 A1 | 1/2009 | Shultz et al. |
| 2010/0250824 A1* | 9/2010 | Belay ................ G06F 9/45558 711/6 |
| 2011/0314247 A1 | 12/2011 | Choi |
| 2012/0233435 A1 | 9/2012 | Ben-Yehuda et al. |
| 2012/0266018 A1* | 10/2012 | Tanaka ............... G06F 11/2097 714/19 |
| 2013/0145073 A1 | 6/2013 | Tuch et al. |
| 2015/0293841 A1* | 10/2015 | Akirav ............... G06F 12/1081 711/104 |
| 2015/0324227 A1* | 11/2015 | Sizemore ................ G06F 9/48 718/1 |

OTHER PUBLICATIONS

International Search Report for PCT/KR2016/006570, dated Sep. 26, 2016, 4 pages.
Written Opinion of the ISA for PCT/KR2016/006570, dated Sep. 26, 2016, 12 pages.

* cited by examiner

ELECTRONIC DEVICE HAVING MULTI-OPERATING SYSTEM AND METHOD FOR MANAGING DYNAMIC MEMORY FOR SAME

This application is the U.S. national phase of International Application No. PCT/KR2016/006570 filed 21 Jun. 2016, which designated the U.S. and claims priority to KR Patent Application No. 10-2015-0158033 filed 11 Nov. 2015, the entire contents of each of which are hereby incorporated by reference.

TECHNICAL FIELD

The present disclosure relates to an electronic device having a multi-operating system, and more particularly, to a method for managing a dynamic memory between a host operating system and a guest operating system in a virtualization computing system having the host operating system and a plurality of guests operating systems, to improve performance of each operating system.

BACKGROUND ART

Recently, use of the virtualization technology driving a plurality of operating systems in one device expands to a mobile device such as tablet PC, smart phone, smart car, or the like. In a related art, development of the virtualization technology has been confined to a desktop computer or certain industrial fields. However, as the technology of mobile platforms advances with the general operating system (OS) that supports expansion to a desktop level, efforts to expand virtualization to a mobile field are actively performed.

The virtualization technology abstracts physical devices and provides independent runtime environments. In a computing system that drives two or more operating systems in one electronic device using virtualization, the host operating system and the guest operating system operating in a virtual machine within the host operating system environment may run like separate operating systems from each other. In this example, the guest OS operating in the virtual machine may share and distribute CPU, memory, storage space, or the like of the electronic device with the host OS.

In a related art, for example, tablet PC or the smart phone using a plurality of operating systems has put higher importance on the applications according to functions thereof and the applications that have been used more recently. In this example, when the host OS has shortage of available memory, an application that uses more memory space, but has a lower priority order is "killed". Accordingly, the guest OS of the virtual machine that is executed in a form of an application of the host OS and that uses larger memory space, is highly likely to be killed when the host OS has shortage of memory space. In other words, in these circumstances, the guest OS is stopped abnormally and unexpectedly.

Accordingly, in the electronic device using a plurality of OS, the host OS and the guest OS require a technology to enhance performance of each OS by managing limited resource and memory.

DISCLOSURE

Technical Problem

Accordingly, an object of the present disclosure is to provide a method for managing a dynamic memory between a host operating system and a guest operating system in a virtualization computing system having the host operating system and a plurality of guests operating systems, to improve performance of each operating system, and an electronic device having the method.

Technical Solution

In order to achieve the objects described above, an electronic device having a multi-operating system (OS) executed thereon is provided, which may include a first memory management module configure to make a direct determination of transmission of a memory of a first operating system (OS) to a second operating system (OS) and recovery of the transmitted memory to the with respect to available memory state of the first and second OS, and enable a request for execution of the transmission and recovery to the second OS; a first state collection module configured to collect memory availability state information of the first OS, and collect memory information of the second OS at a designated collecting interval by means of a request to the second OS; a memory allocation module configured to allocate, by the second OS, a dynamic memory of the first OS according to the request of the first OS; a second state collection module configured to collect memory availability state information of the second OS; and a second memory management module configured to manage a memory of the second OS by receiving a memory of the first OS or returning the transmitted memory to the first memory based on the dynamic memory allocation information.

The first OS memory management module may determine the memory availability state information of the first OS and the second OS, and when the second OS is executed as a main system and the first OS is executed as a sub system, enable a request of transmission to the memory allocation module so that the second OS uses available memory of the first OS, in which, when the first OS is executed as a main system, the first OS may request the memory allocation module for a recovery of the transmitted memory.

The first memory management module may determine transmission of a memory from the first OS to the second OS and a minimum available memory amount according to the determined memory availability state, and determine either of the transmission and the recovery of the memory of the first OS to the second OS based on the determined memory availability state and the minimum available memory amount.

The minimum available memory amount may be designated by the first OS as a minimum unit of an available memory amount for executing an application of the first OS, and the first OS may enable a request for a recovery of a memory to the second OS according to the designated available memory amount, and the designated available memory amount is determined according to an average amount used by the application.

The determining of the transmission or the recovery may include determining whether the first OS transmits or recovers the memory to the second OS, and enabling a request to the memory allocation module of the second OS according to a result of the determining.

A plurality of first OS may be provided, in which, in a distributed computing, the plurality of first OS may determine whether the first memory management module installed in each first OS is to transmit a memory of the first OS to the second OS or recover it to the first OS.

The collecting interval may be determined according to whether the first OS and the second OS approach memory pressure and whether an amount of memory use is varied, and the first OS may execute the first memory management module without waiting until the designated collecting interval when a memory pressure event of the first OS and the second OS occurs.

The memory allocation module may allocate a memory of the first OS to the second OS according to the request of the first OS or execute recovery of the allocated memory to the first OS, in which, when the plurality of first OS are provided, the memory allocation module may allocate the memory of the first OS to another one of the first OS.

The second memory state collection module may collect memory availability state information of the second OS when state of the second OS changes, and transmit the information to the first OS upon request for the information of the first OS or transmit memory pressure of the second OS to the first OS when the memory of the second OS is low.

The first OS may be a guest operating system, and the first memory management module and the first state collection module may be executed within the guest operating system of a virtual machine. The second OS may be a host operating system, and the second memory management module, the memory allocation module and the second state collection module may be executed within the host OS.

Meanwhile, a method for managing a dynamic memory between a first operating system (OS) and a second OS in an electronic device having multi-operating systems is provided according to another embodiment, which may include first memory managing operation of making a direct determination of transmission of a memory of a first operating system (OS) to a second operating system (OS) and recovery of the transmitted memory to the with respect to available memory state of the first and second OS, and enabling a request for execution of the transmission and recovery to the second OS; first state collecting operation of collecting memory availability state information of the first OS, and collecting memory information of the second OS at a designated collecting interval by means of a request to the second OS; memory allocating operation of allocating, by the second OS, a dynamic memory of the first OS according to the request of the first OS; second state collecting operation of collecting memory availability state information of the second OS; and second memory managing operation of managing a memory of the second OS by receiving a memory of the first OS or returning the transmitted memory to the first memory based on the dynamic memory allocation information.

The first OS memory managing operation may include determining the memory availability state information of the first OS and the second OS, and when the second OS is executed as a main system and the first OS is executed as a sub system, enabling a request of transmission so that the second OS uses available memory of the first OS, in which, when the first OS is executed as a main system, the first OS may request the memory allocation module for a recovery of the transmitted memory.

The first memory managing operation may include determining transmission of a memory from the first OS to the second OS and a minimum available memory amount according to the determined memory availability state, and determining either of the transmission and the recovery of the memory of the first OS to the second OS based on the determined memory availability state and the minimum available memory amount.

The minimum available memory amount may be designated by the first OS as a minimum unit of an available memory amount for executing an application of the first OS, and the first OS may enable a request for a recovery of a memory to the second OS according to the designated available memory amount, and the designated available memory amount is determined according to an average amount used by the application.

The determining of the transmission or the recovery may include determining whether the first OS transmits or recovers the memory to the second OS, and enabling a request to the memory allocation module of the second OS according to a result of the determining.

A plurality of first OS may be provided, in which, in a distributed computing, the plurality of first OS may determine whether the first memory management module installed in each first OS is to transmit a memory of the first OS to the second OS or recover it to the first OS.

The collecting interval may be determined according to whether the first OS and the second OS approach memory pressure and whether an amount of memory use is varied, and the first OS may execute the first memory management module without waiting until the designated collecting interval when a memory pressure event of the first OS and the second OS occurs.

The memory allocation module may allocate a memory of the first OS to the second OS according to the request of the first OS or allocate the memory to execute the recovery to the first OS, in which, when the plurality of first OS are provided, the memory allocation module may allocate the memory of the first OS to another one of the first OS.

The second memory state collection module may collect memory availability state information of the second OS when state of the second OS changes, and transmit the information to the first OS upon request for the information of the first OS or transmit memory pressure of the second OS to the first OS when the memory of the second OS is low.

The first OS may be a guest operating system, and the first memory management module and the first state collection module may be executed within the guest operating system of a virtual machine. The second OS may be a host operating system, and the second memory management module, the memory allocation module and the second state collection module may be executed within the host OS.

Advantageous Effects

According to various embodiments described above, an electronic device having a plurality of operating systems and a method thereof for managing a dynamic memory can prevent performance deterioration due to memory shortage of a host operating system (OS) and a guest operating system (OS), by collecting, at the guest OS, memory availability state information of the guest OS and the host OS, and transmitting a memory unused by the guest OS to the host OS, and recovering the memory transmitted to the host OS when the guest OS has shortage of memory.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

BEST MODE

Figure 1:
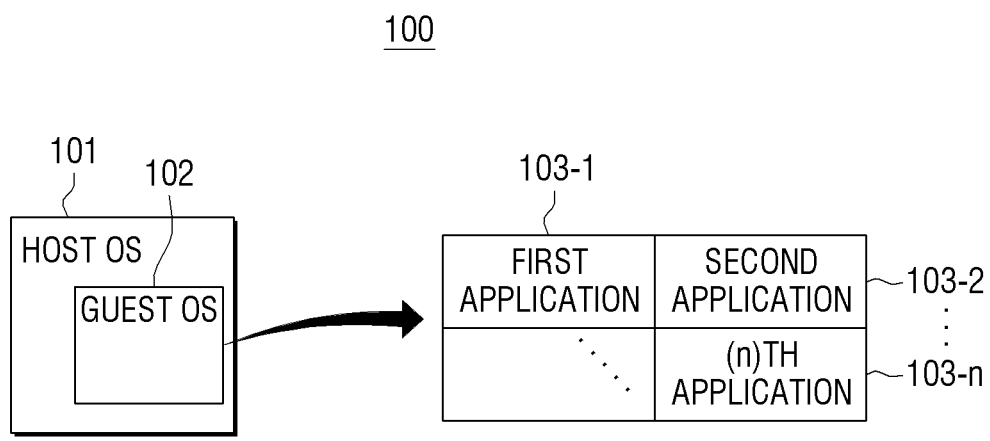
FIG. 1 illustrates an electronic device having a guest operating system ("first OS") and a host operating system ("second OS") according to an embodiment.

The technical terminology used herein is only for describing certain exemplary embodiments, and not intended to limit the scope of the disclosure. Further, unless specifically defined otherwise, the technical terminology used in the specification should be construed as it is generally understood by a person skilled in the art, and should not be construed as excessively broad meaning or excessively narrow meaning. Further, when technical terms used herein fail to express technical concept of the present disclosure correctly, those should be replaced with another technical terms that can be correctly understood by a person skilled in the art. Further, general terms used in the present disclosure should be construed as defined in the dictionary or based on preceding or following contexts, and should not be construed as excessively narrow meaning.

Further, unless otherwise specified, a singular expression used herein includes a plural expression. In the present disclosure, terms such as "composed of" or "comprise" should not be interpreted as encompassing all of constituent elements or processes disclosed herein. Rather, it should be construed that some of constituent elements or processes may not be included or that additional constituent elements or processes may be further included.

Further, a suffix "unit" following an element used herein is given or combined only in consideration of convenience of writing the description, and does not have any distinctive meaning or role in itself.

The expression, "first," "second," and so on as used herein may be used in describing a variety of elements, but these elements should not be limited to the expression. The expressions are used only for the purpose of distinguishing one element from another. For example, without departing from the scope of the present disclosure, a first element may be referred to as a second element, and similarly, the second element may also be referred to as the first element.

The embodiments of the present disclosure will be explained in greater detail below with reference to the drawings. Regardless of reference numerals in the drawings, the same or similar constituent elements are given the same reference numerals and overlapping explanation thereof is omitted for the sake of brevity.

Further, in explaining the present disclosure, any specific explanation on a well-known related configuration or function deemed to obscure the gist of the present disclosure will be omitted. Further, while the attached drawings are provided to help easily understand the present disclosure, the technical concept of the present disclosure should not be construed as being limited to the attached drawings.

Hereinafter, preferred embodiments of the present disclosure will be described in detail with reference to the accompanying drawings. FIG. 1 illustrates an electronic device 100 having a host operating system 101 and a guest operating system 102 having a plurality of applications 103-$n$ according to an embodiment. According to an embodiment, the host OS 101 may be a second OS, and the guest OS 102 may be a first OS.

Further, the host OS 101 and the guest OS 102 may execute various data and applications in each OS. The guest OS 102 may be an OS operating in a virtual machine. In this example, the host OS 101 and the guest OS 102 may share CPU (not illustrated), a memory (not illustrated) and a storage space (not illustrated) of the electronic device 100.

According to an embodiment, the guest OS 102 may transmit a memory, which is not used in the guest OS 102, to the host OS 101. Further, the guest OS 102 may request a recovery of the memory transmitted to the host OS 101 and receive it, when the guest OS 102 requires a memory in order to execute an application.

Referring to FIG. 1, according to an embodiment, the electronic device 100 may have both the host OS 101 and the guest OS 102 at the same time. Further, the electronic device 100 may include one host OS 101 and a plurality of guests OS 102-$n$ (not illustrated).

According to an embodiment, when a user selects an application executed by the guest OS, applications operating in the guest OS 102 may be executed on a main display of the electronic device 100, and applications executed by the host OS 101 may operate as a sub-screen in the electronic device 100 or stop operating. In other words, the electronic device 100 may execute the selected application through the OS selected by a user.

Specifically, according to an embodiment, the electronic device 100 may be a mobile device such as smart phone, tablet PC, smart car, and so on. Further, according to an embodiment, the host OS 101 and the guest OS 102 may be various OS such as mobile platform or the like. In this example, a plurality of applications 103-$n$ may be applications provided from the guest OS 102.

Figure 2:
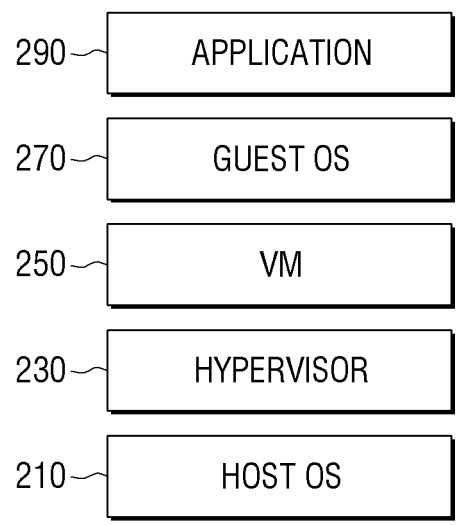
FIG. 2 is a block diagram of a virtualization computing system according to an embodiment.

FIG. 2 is a block diagram of a virtualization computing system according to an embodiment. The virtualization computing environment may be divided into type 1 and type 2 according to position of a hypervisor. In the present disclosure, the related technology well-known to a person skilled in the art will not be specifically explained, and the technology according to an embodiment will be briefly described.

Referring to FIG. 2, according to an embodiment, the electronic device 100 may be applied with the type 2 virtualization computing environment of the virtualization technology.

The virtualization computing environment applied with the type 2 virtualization technology has hardware (not illustrated) including a central processing unit (CPU) (not illustrated), a memory (not illustrated), an input/output device (not illustrated) or the like, which is positioned in the lowest level.

The host OS 200 may be positioned above hardware (not illustrated), and the hypervisor 230 or a virtual machine monitor (not illustrated) may be positioned above the host OS 200.

Through the virtual machine (VM) 250, the hypervisor 230 may then provide environment in which the guest OS 270, which is a new OS, may be independently executed.

In other words, in the type 2 virtualization computing environment, an application (not illustrated) executed in the host OS 210 and an application 290 executed on the guest OS 270 may provide effects that they are executed in virtually different physical spaces from each other.

Therefore, while the two different OS (i.e., host OS and guest OS) may share the same hardware (not illustrated), they simultaneously operate in different virtual physical spaces from each other.

Although one guest OS 270 is illustrated in an embodiment, a plurality of guest OS 270 may be operated. In other words, N number of guest OS 270*n* respectively corresponding to virtual machines 250*n* may be positioned above N number of the virtual machines 250*n*. Further, M number of applications 290*m* corresponding to guest OS 270*n* may be operated in N number of the guest OS 270*n*.

Figure 3:
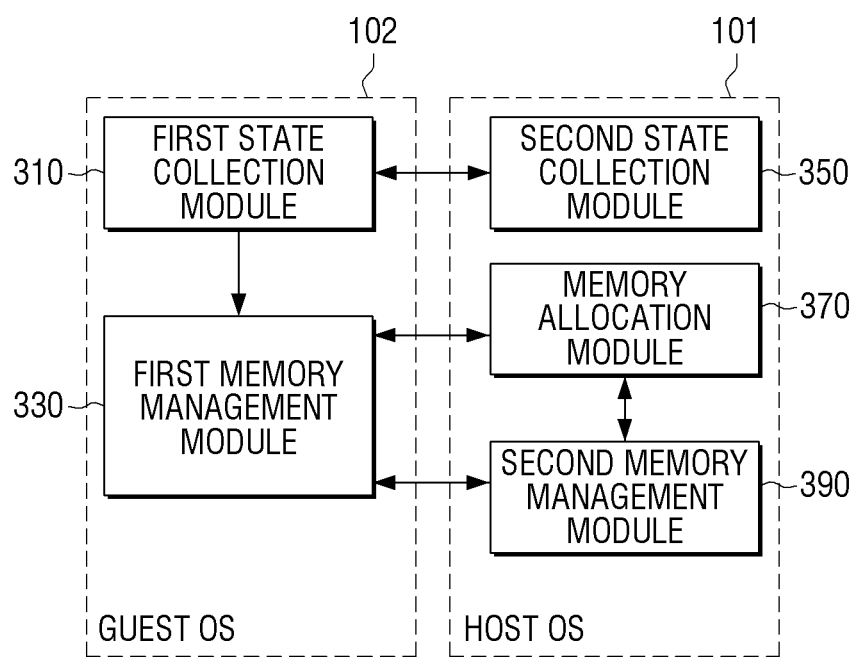
FIG. 3 is a block diagram of a first OS and a second OS according to an embodiment.

FIG. 3 is a block diagram of a first OS and a second OS according to an embodiment. Referring to FIG. 3, the first OS may be the guest OS 102, and the second OS may be the host OS 101. The guest OS 102 may be operated within the virtual machine (not illustrated).

Referring to FIG. 3, according to an embodiment, a first state collection module 310 and a first memory management module 330 may be user-level applications loaded within the virtual machine (not illustrated). Specifically, the first state collection module 310 may collect memory availability state information of the first OS 102. In this example, the memory availability state information may be a total memory designated to the first OS 102. Further, the memory availability state information may be a free memory of the total memory designated to the first OS 102 remaining after applications operating in the first OS 102 are executed. Further, the memory availability state information may be size of available memory that can be transmitted to the second OS 101 by the first OS 102.

Further, the first state collection module 310 may collect memory information of the second OS 101 at a designated collecting interval by means of a request to second state collection module 350 of the second OS 101. The information collected by the first state collection module 310 may be transmitted to the first memory management module 330. In this example, according to an embodiment, when executing memory information collection of the second OS 101, the first state collection module 310 may perform it by accessing a virtual memory information register to minimize overhead.

Further, the first state collection module 310 may designate an interval of collecting the memory state information of the first OS 102 and the second OS 101 according to whether state of memory shortage ("memory pressure") of the first OS 102 and the first OS 101 is approaching or not, and according to changes in the memory use by each OS 102, 101. In this example, the first OS 102 may transmit a memory to the second OS 101 based on the memory state information of the first OS 102 and the second OS 101, and request a recovery of the memory transmitted to the second OS 101.

However, unnecessarily frequent collection of and request for the state information may result in frequent processing of CPU, therefore, consuming significant power. Therefore, when an amount of a memory transmitted to the second OS 101 from the designated total memory of the first OS 102 exceeds a designated threshold of the total memory of the first OS 102, the collecting interval may be varied according to such changed amount of the remaining memory in the first OS 102.

Specifically, for example, the first OS 102 may be allocated with 1 GB of the designated total memory. In other words, the memory may be designated such that, when a user selects the first OS 102 in the electronic device 100 to execute it, the first OS 102 is allocated with 1 GB and executed within the 1 GB memory limit.

In this example, when the electronic device 100 is a smart phone for example, when a user selects the first application 103-1 of the first OS 102 in the electronic device 100, the first OS 102 may allocate 200 MB of the designated 1 GB to execute the first application 103-1. Further, when a user selects the fourth application 103-4, the first OS 102 may allocate 200 MB to execute the fourth application 103-4. In this example, the first OS 102 may use memory of 400 MB from 1 GB, and transmit a portion of the rest 600 MB to the second OS 101 according to memory pressure of the second OS 101.

In this example, when an amount of a memory used by the first OS 102 to execute the (n)th application 103-*n* and an amount of a memory transmitted to the second OS 101 by the first OS 102 exceed 650 MB (65% of total memory), i.e., exceed designated threshold of 1 GB, the first state collection module 310 may request the second state collection module 350 for the memory state information of the second OS 101.

For example, when the first OS 102 is using more than 95% of the designated threshold (65%) of the designated total memory, the first state collection module 310 may request the second OS 101 for memory state information at a 2 second interval. In other words, when 95% (617 MB) of the designated threshold (650 MB (65%)) is used to execute the first OS 102 of the designated 1 GB memory of the first OS 102, state information may be requested to the host OS 101 at a short interval because there may be a low memory available to execute the first OS 102.

For example, when the first OS 102 is using memory from 80% to 95% of the designated threshold (65%) of the designated total memory, the first state collection module 310 may request the second OS 101 for memory state information at a 4 second interval. In other words, when from 80% to 95% (from 520 MB to 617 MB) of the designated threshold (650 MB (65%)) is used to execute the first OS 102 of the designated 1 GB memory of the first OS 102, the state information may be requested at an increased interval by adding x second(s) to 4 seconds (4+x) as the memory use of the first OS 102 is decreased.

For example, when the first OS 102 is using less than 80% of the designated threshold (65%) of the designated total memory, the first state collection module 310 may request the second OS 101 for memory state information at a 10 second interval. In other words, when less than 80% (520 MB) of the designated threshold (650 MB (65%)) is used to execute the first OS 102 of the designated 1 GB memory of the first OS 102, the first OS 102 has high available memory and therefore, the state information may be requested at an increased interval by adding x second(s) to 10 seconds (10+x) as the memory use of the first OS 102 is decreased.

However, the collecting intervals exemplified above are merely one of embodiments to explain the present disclosure, and a designated total memory of the guest OS 102 may be varied according to the guest OS 102. Further, a threshold with respect to a designated memory of the guest OS 102 and setting an interval based on the same, may be varied according to a memory use and changed amount of the memory.

The first memory management module 330 may be executed in a kernel (not illustrated) within the guest OS 102. However, this is merely one of embodiments to illustrate the present disclosure, and when the electronic device 100 is a desktop computer, the first memory management module 330 may be a driver (not illustrated) of the guest OS 102.

Further, according to memory availability state of the first OS 102 and the second OS 101 collected at the first state collection module, the first memory management module 330 may determine to transmit a memory of the first OS 102 to the second OS 101 and determine to recover the memory transmitted to the second OS 101 back to the first OS 102. In the above example, the first memory management module may request the memory allocation module 370 based on the memory transmission and recovery determination, and the memory allocation module 370 may transmit the request received from the first memory management module 330 to the second memory management module 390. The first memory management module 330 may transmit the memory of the first OS 102 to the second OS 101 directly through the second memory management module 390, i.e., without involving the memory allocation module 370, when memory pressure occurs at the second OS 101. Further, the first memory management module 330 may immediately request the memory allocation module 370 to recover the memory transmitted to the second OS 101 by the first OS 102, when memory pressure occurs at the first OS 102.

Further, the first memory management module 330 may recover the memory transmitted to the second OS 101 by the first OS 102 by means of a request to the memory allocation module 370, when the first OS 102 is executed as a main system in the electronic device 100. In this example, when requesting a recovery of the transmitted memory from the second OS 101, the first memory management module 330 may try not to cause critical memory shortage of the second OS 101 so that the main services being executed in the second OS 101 are not killed. In other words, memory may be recovered from the second OS 101 by considering a minimum available memory and a designated threshold memory of the first OS 102.

For example, according to an embodiment, when the electronic device 100 is a smart phone and when a user selects the first OS 102 on a screen of the smart phone 100, the first OS 102, which is the guest OS, may be executed as a main system on a front side of the screen of the smart phone 100 that is currently interacting with a user. Meanwhile, the second OS 101 may be on a back side that is not interacting with the user currently. In this example, the first OS 102 may request to recover the memory of the first OS 102 previously transmitted to the second OS 101. However, when the available memory of the second OS 101 is in critical low state, the first memory management module of the first OS 102 may be configured to control the amount of memory to be recovered from the second OS 101 so as not to kill main services (e.g., call function, alarm function, or the like) being executed in the second OS 101.

Meanwhile, the first memory management module 330 may transmit a memory of the first OS 102 to the second OS 101 by means of a request to the memory allocation module 370, when the second OS 101 is executed as a main system in the electronic device 100 and when the first OS 102 is executed as a sub system.

For example, according to an embodiment, when the electronic device 100 is a smart phone and when a user selects an application operating in the second OS 101 on the screen of the smart phone 100, the second OS 101, which is the host OS, may be executed as a main system on a front side of the screen of the smart phone 100 currently interacting with a user. Meanwhile, the first OS 102 may be on a back side that is not interacting with the user currently. In this example, the first OS 102 may transmit available memory of the first OS 102 to the second OS 101 as much as possible. However, when the first OS 102 reaches a minimum available memory amount required by the first OS 102 to be executed, the first OS 102 may request to receive a memory transmitted to the second OS 101.

Further, the first memory management module 330 may determine the minimum available memory amount to transmit the memory from the first OS 102 to the second OS 101 and recover the transmitted memory back to the first OS 102, according to memory availability state information of the first OS 102 and the second OS 101 collected at the first state collection module 310. The minimum available memory amount is a minimum unit of an available memory that can be used to execute applications of the first OS 102, and may be determined according to an average memory use of applications. In this example, the minimum unit of an available memory may be previously designated by the first OS 102.

According to an embodiment, the first OS 102 may be allocated with 1 GB of designated memory. Further, the first OS 102 may designate 650 MB, which is 65% of a designated 1 GB memory, as a threshold value. Further, the minimum available memory amount to recover the memory transmitted to the second OS 101 by the first OS 101 may be designated to be 64 MB. In this example, the first OS 102 may not request a recovery of the memory transmitted to the second OS 101 as long as there still remains 64 MB of 1 GB. Therefore, power may be saved by reducing a frequency of requesting the memory allocation module 370 of the second OS 101 for the transmission and recovery of the memory, and the second OS 101 may execute an application in stable memory state.

Meanwhile, when the minimum available memory amount is not designated, the first memory management module 330 may request the second OS 101 for a recovery of a memory based on a designated threshold value (650 MB) of the first state collection module 310. In this example, when the second OS 101, which is the host OS, uses a considerable amount of memory to execute an application, it may frequently exceed the threshold value (650 MB). In this example, the first OS 102 may frequently request the memory allocation module 370 of the second OS 101 for a recovery of a memory.

However, while the embodiments described above are provided to explain how the minimum available memory of the first memory management module 330 is set, the present disclosure may be implemented in various other embodiments, according to an average memory use of the application 103-*n* in the guest OS 102.

Therefore, the first memory management module 330 may reduce a frequency of recognizing memory pressure of the second OS 101, by designating a minimum available memory to request a recovery of the memory transmitted to the second OS 101 by the first OS 102. Further, the first OS 102 may reduce a frequency of requesting the second OS 101 for a recovery of a memory. Accordingly, the second OS 101 may execute an application stably because memory is transmitted from the first OS 102 for the insufficient memory, and save power because the frequency of requests is reduced.

The second state collection module 350 may be executed in the kernel (not illustrated) memory management system of the host OS 101, and executed at a user level of the host OS 101. However, this is merely one of embodiments for the present disclosure, and when the electronic device 100 is a desktop computer, the second state collection module 350 may be executed in a driver of the host OS 101.

Further, when the state of the second OS 101 changes, the second state collection module 350 may collect memory availability state information of the second OS 101. The change in the state of the second OS 101 may be, for example, a memory state change of the second OS 101 that occurs when applications operating on the second OS 101 is being executed or when a user selects and executes the first OS 102.

Further, the second state collection module 350 may transmit memory state information of the second OS 101 to the first state collection module 310 when the first OS 102 requests memory state information of the second OS 101. Further, when the memory of the second OS 101 is low, the second state collection module 350 may transmit the memory pressure event to the first state collection module 310 so that the memory state of the second OS 101 can be determined.

The memory allocation module 370 may be executed in a user level application of the host OS 101. Further, according to a request of the first memory management module 330, the memory allocation module 370 may perform transmission of the memory of the first OS 102 to the second OS 101 or recovery of the transmitted memory back to the first OS 102.

When there are a plurality of first OS 102, the memory allocation module 370 may transmit the memory of the first OS 102 to the second OS 101 or transmit the memory of the first OS 102 to another first OS 102-n (not illustrated) in a distributed computing with the first memory management module 330 installed in each of the first OS 102.

For example, according to an embodiment, the electronic device 100 may be a smart phone, the first OS 102 may be the first OS, another first OS 102-1 (not illustrated) may be the second OS for business use, and the second OS 101 may be the second OS for personal use. In this example, the first OS 102 may use 200 MB of the designated 1 GB memory to execute the first application 103-1. The first OS 102 may request the memory allocation module 370 to transmit the rest 800 MB memory, but excluding 64 MB minimum available memory for requesting a recovery of the memory, to the second OS 102-1 (not illustrated) for business use.

The second memory management module 390 may be executed in the kernel (not illustrated) of the host OS 101 according to an embodiment. However, this is merely one of embodiments for the present disclosure, and when the electronic device 100 is a desktop computer, the second memory management module 390 may be executed in a driver of the host OS 101.

Further, the second memory management module 390 may receive a memory from the first OS 102 and transmit the memory back to the first OS 102, based on the information received from the memory allocation module 370. In other words, when the first OS 102 requests a recovery of a memory to the second OS 101 through the memory allocation module 370, the second memory management module 390 may re-transmit the memory transmitted from the first OS 102 through the first memory management module 330. Further, when the memory of the second OS 101 is low, the second memory management module 390 may receive the memory of the first OS 102 directly from the first memory management module 330 without involving the memory allocation module 370.

Figure 4:
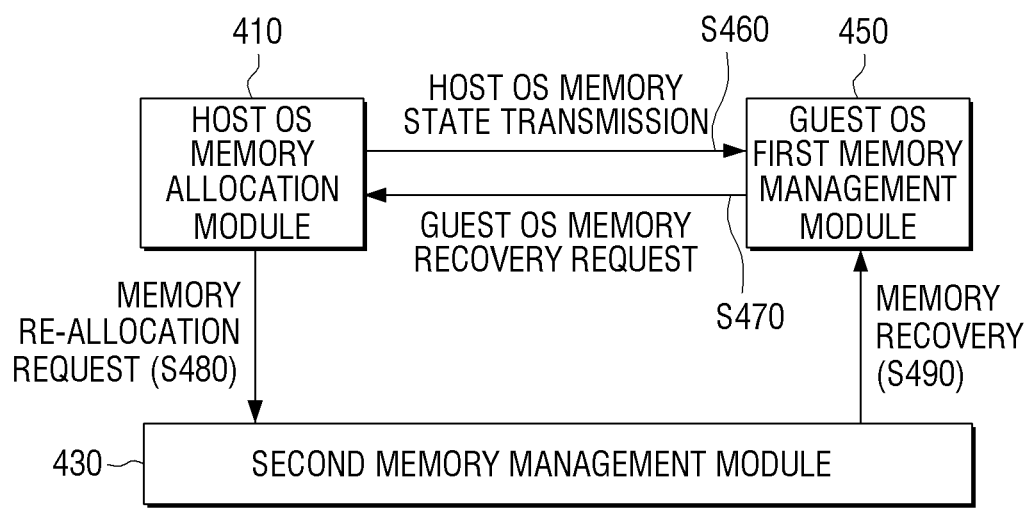
FIG. 4 illustrates dynamic memory management when a first OS is executed as a main system according to an embodiment.

FIG. 4 illustrates dynamic memory management when a first OS 102 is executed as a main system according to an embodiment. Referring to FIG. 4, when the first OS 102 is operating as a main system in the electronic device 100, the first memory management module 450 within the first OS 102 may determine the memory state information of the second OS 101 at S460, and request the memory allocation module 370 for a recovery of the memory transmitted to the second OS 101 by the first OS 102, at S470.

In this example, when memory state (S460) of the second OS 101 transmitted from the memory allocation module 410 is indicative of critically low memory state, the first memory management module 450 may be configured to adjust an amount of memory to be recovered so that the main services being executed in the second OS 101 are not killed. In other words, the first OS 102 may be configured such that the memory may be recovered from the second OS 101 by considering a minimum available memory and a designated threshold memory of the first OS 102.

Further, the memory allocation module 410 at S480 may transmit a request of recovery of the memory received from the first memory management module 450 at S470 to the second memory management module 450, and at S490, the second OS 101, which is the host OS, may recover the memory requested from the first OS 102 by returning the memory previously transmitted from the first OS 102 to the first OS 102, which is the guest OS.

For example, according to an embodiment, when the electronic device 100 is a smart phone and when a user selects the first OS 102 on a screen of the smart phone 100, the first OS 102, which is the guest OS, may be executed as a main system on a front side of the screen of the smart phone 100 that is currently interacting with a user.

Meanwhile, the second OS 101 may be on a back side that is not interacting with the user currently. In this example, the first OS 102 may request to recover the memory of the first OS 102 previously transmitted to the second OS 101. However, when the available memory of the second OS 101 is in critical low state, the first memory management module 450 of the first OS 102 may be configured to control the amount of memory to be recovered from the second OS 101 so as not to kill main services (e.g., call function, alarm function, or the like) being executed in the second OS 101.

Figure 5:
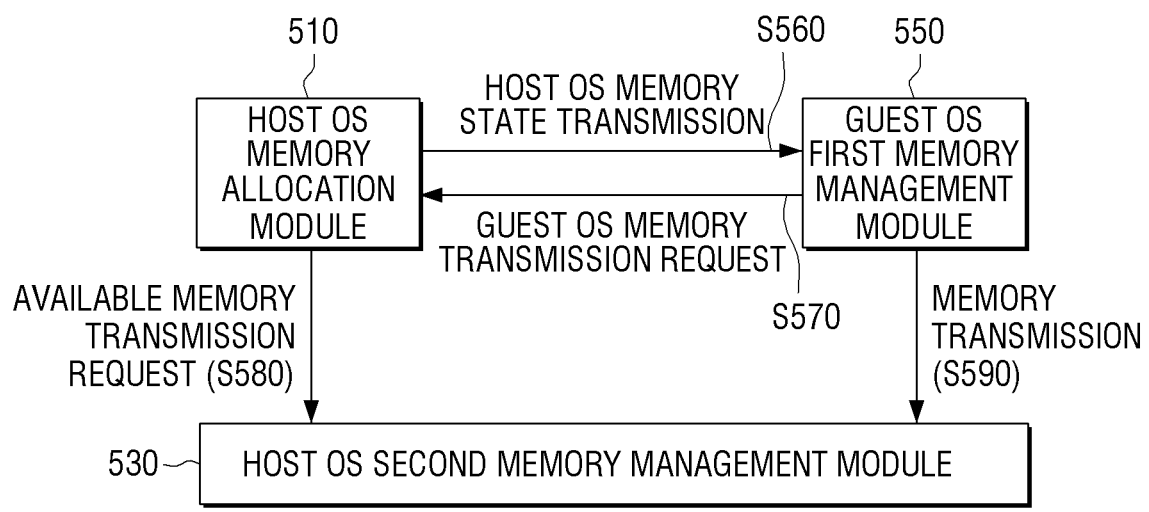
FIG. 5 illustrates dynamic memory management when a first OS is executed as a sub system according to an embodiment.

FIG. 5 illustrates dynamic memory management when a first OS 102 is executed as a sub system according to an embodiment. Referring to FIG. 5, when the second OS 101 as the host OS is operating as a main system in the electronic device 100, the first memory management module 550 within the first OS 102 may determine the memory state information of the second OS 101 at S560, and request the memory allocation module 510 for a transmission of the memory to the second OS 101 by the first OS 102, at S570.

Further, the memory allocation module 510 may transmit a memory transmission request received from the first memory management module 550 to the second memory management module 530 at S580, and the second memory management module 530 may be allocated with an available memory of the first OS 102 from the first memory management module 550 at S580. In this example, applications within the second OS as the host OS 101 may be executed, without the first OS 102 as the guest OS being killed. Therefore, in transmitting the memory of the guest OS 102 due to memory shortage of the host OS 101, unexpected abnormal end of the applications 103-n being executed within the guest OS 102 may be prevented.

For example, according to an embodiment, when the electronic device 100 is a smart phone and when a user selects an application (e.g., camera, scheduling, etc.) operating in the second OS 101 on the screen of the smart phone 100, the second OS 101, which is the host OS, may be executed as a main system on a front side of the screen of the smart phone 100 currently interacting with a user.

Meanwhile, the first OS 102 may be on a back side that is not interacting with the user currently. In this example, the first OS 102 may request to transmit the available memory of the first OS 102 to the second OS 101. However, the first OS 102 may have a minimum available memory designated so as not to kill the applications 103-n of the first OS while they are being executed on the back side of the screen. In other words, the first memory management module 550 may be configured to transmit the memory to the second OS 101 while leaving the minimum available memory necessary to execute the first OS 102.

Figure 6:
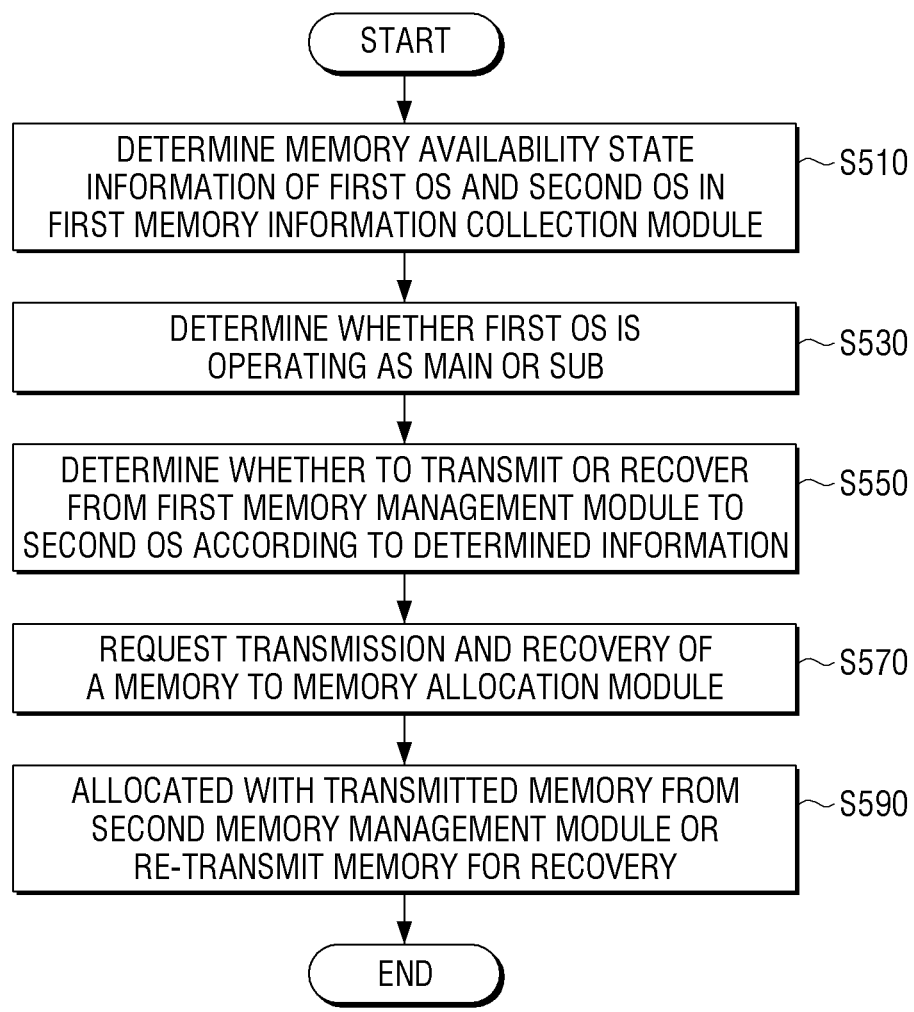
FIG. 6 is a flowchart provided to explain dynamic memory management according to an embodiment.

FIG. 6 is a flowchart provided to explain dynamic memory management according to an embodiment. Referring to FIG. 6, according to an embodiment, the first OS 102 of the electronic device 100 may determine memory availability state information of the first OS 102 and the second OS 101, at S610. In this example, the first OS 102 and the second OS 101 may collect information on any activity in the execution state of the applications and change in the amount of the memory of each OS. Further, the first OS 102 may request the second OS 101 for the memory state information of the second OS 101 and collect memory state information of the second OS 101.

Further, according to an embodiment, at S630, the first OS 102 of the electronic device 100 may determine whether the first OS 102 is being executed as a main system or a sub system. Further, according to an exemplary embodiment, at S650, the first OS 102 may determine whether the memory of the first OS 102 is transmitted to the second OS 101 or the memory transmitted to the second OS 101 is recovered by the first OS 102, based on the memory availability state information of the first OS 102 and the second OS 101 collected at the first OS 102 and information with respect to whether the first OS 102 is being executed as a main system of the electronic device 100.

Further, the first OS 102 may request the second OS 101 for the transmission and recovery of memory according to the determination as to the memory transmission and recovery, at S670. According to an embodiment, the second OS 101 may receive the memory transmitted to the second OS 101 by the first OS 102 and use it for executing the second OS 101, and re-transmit the memory to the first OS 102 as requested by the first OS 102, at S690.

Figure 7A:
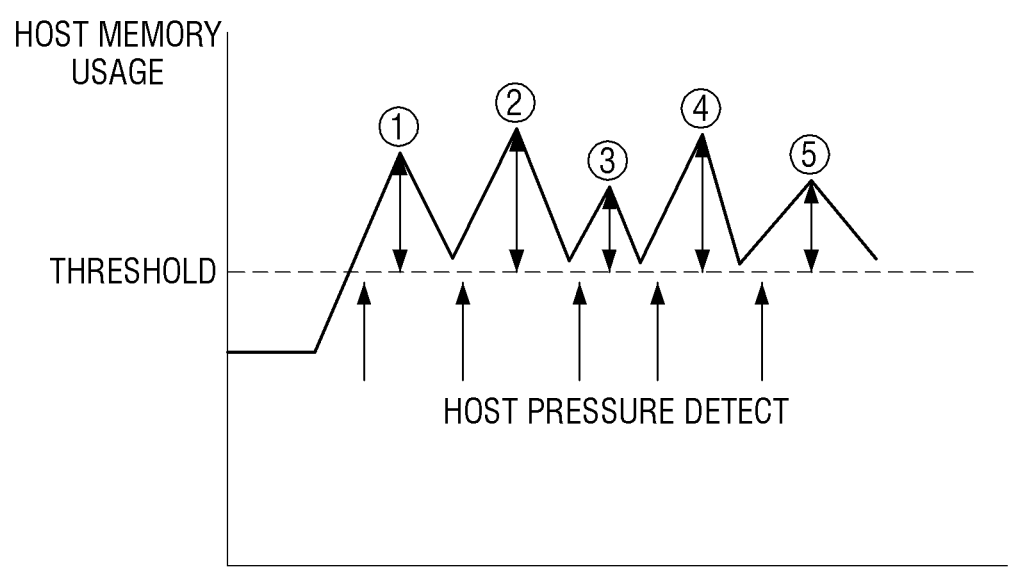
FIGS. 7A and 7B are graphs illustrating frequency of memory transmission and recovery requests based on a minimum memory unit for requesting transmission and recovery of a memory from a first OS to a second OS according to the related art and an embodiment of the present disclosure.
Figure 7B:
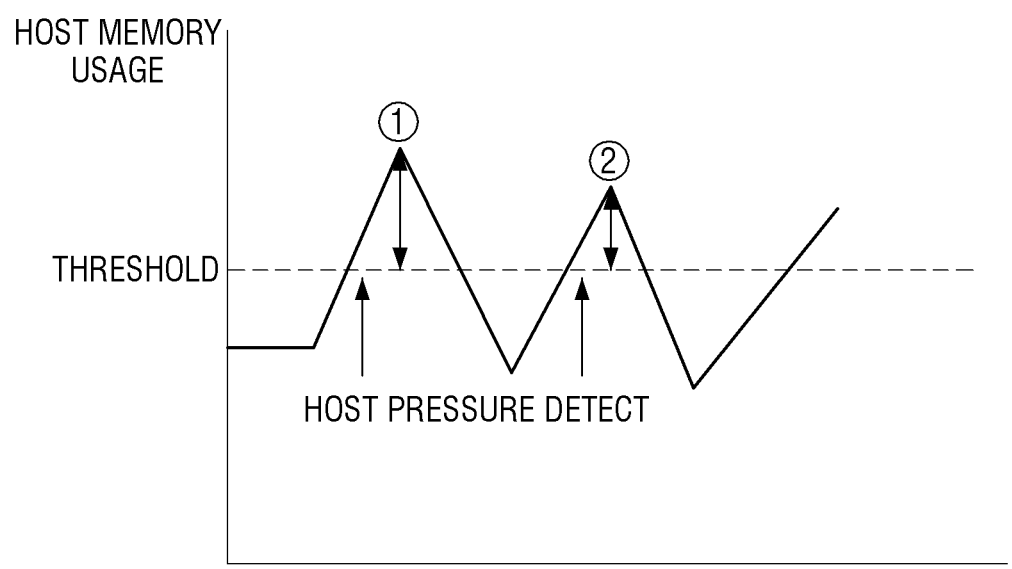

FIGS. 7A and 7B are graphs illustrating frequency of memory transmission and recovery requests based on a minimum memory unit for requesting transmission and recovery of a memory from a first OS 102 to a second OS 101 according to the related art and an embodiment of the present disclosure.

Referring to FIG. 7A, the graphs shows the frequency of memory recovery requests made by the first OS 102 to the second OS 101 in an example of the related art that does not set a minimum available memory amount to transmit a memory to the second OS 101 by the first OS 102 and to recover the transmitted memory back to the first OS 102.

According to an embodiment, the first OS 102 may be allocated with a designated 1 GB memory, and designated with 650 MB, i.e., 65% of designated 1 GB memory of the first OS 102, for a threshold to execute the first OS 102. In this example, when executing an application in the second OS 101 requires use of more memory, the first OS 102 may perceive memory pressure ('host pressure detect') every point at which the memory of the first OS 102 used by the second OS 101 exceeds the threshold (i.e., 650 MB) and thus request the second OS 101 for a recovery of the memory frequently (①, ②, ③, ④, ⑤).

In this example, the frequent requests of the first OS 102 for the memory recovery requires processing at the processor, consuming the power. Further, the second OS 101 may have frequent recovery of the memory to the first OS 102 according to the frequent requests for memory recovery of the first OS 102. Accordingly, operation of the second OS 101 may not be stable.

Referring to FIG. 7B, according to an embodiment, the minimum available memory of the first OS 102 for requesting a recovery of the memory transmitted to the second OS 101 by the first OS 102 may be set to 64 MB. In this example, the first OS 102 may not request a recovery of the memory transmitted to the second OS 101 as long as there still remains 64 MB of 1 GB. Therefore, the second OS 101 may save power as the frequency of recovery requests (①, ②) from the first OS 102 decreases. Further, the second OS 101 may execute an application in a stable memory state.

However, while the embodiments described above are provided to explain how the minimum available memory of the present disclosure is set, the minimum available memory may be implemented in various other embodiments according to an average memory use of the application of the guest OS 102.

Figure 8:
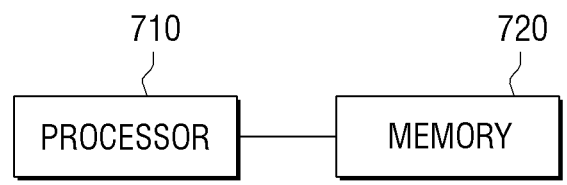
FIG. 8 is a simplified block diagram of an electronic device according to an embodiment.

FIG. 8 is a simplified block diagram of an electronic device according to an embodiment. Referring to FIG. 8, the processor 710 may control the host OS 101, the guest OS 102, and the memory 720 of the electronic device 100. The memory 720 may store programs and data implementing therein various functions to control the host OS 101 and the guest OS 102. Further, the memory 720 may store information with respect to the minimum available memory use of the first OS designated for requesting a recovery of the memory transmitted by the guest OS 102 to the host OS 101. Further, the memory 720 may store a designated interval according to which the first OS 102 may collect memory state information of the second OS 102.

The memory 720 may store various programs and data necessary for the operation of the electronic device 100. The memory may be configured as a non-volatile memory, a volatile memory, a flash memory, a hard disk drive (HDD), a solid state drive (SDD) or the like. The memory may be accessed by the processor, and data of the memory may be read/recorded/revised/deleted/renewed by the processor. In the present disclosure, the memory 720 may include a memory, ROM, RAM, or a memory card (not illustrated) (e.g., micro SD card, memory stick) attached to the electronic device. The memory 720 may store software including OS, kernel, middleware, applications, or the like.

The device or the method according to various embodiments may be performed with at least one computer (e.g., processor) performing instructions included in at least one of the programs maintained in computer readable storage medium.

When the instructions are executed by a computer (e.g., processor), at least one computer may perform a function corresponding to the instructions. In this example, the computer readable storage medium may be the memory, for example.

The programs may be included in computer readable storage medium such as hard disk, floppy disk, magnetic media (e.g., magnetic tape), optical media (e.g., compact disc read only memory (CD-ROM), digital versatile disc (DVD), magneto-optical media (e.g., floptical disk), hardware device (e.g., ROM (read only memory), RAM (random access memory), or flash memory) or the like. In this case, the storage medium may be generally included as a part of the constitution of the electronic device 100, although it may be connected through a port of the electronic device 100, or may be included in an external device (e.g., cloud, server, or another electronic device) positioned externally of the electronic device 100.

Further, the programs may be distributed and stored in a plurality of storage media, in which at least some of a plurality of storage media may be positioned in an external device of the electronic device.

Examples of program instructions include machine language codes such as those generated by a compiler, as well as high-level language codes that may be executed by a computer using an interpreter, and so on. The above hardware device may be constituted to operate as one or more software modules in order to perform operation of various embodiments, and vice versa.

While the present disclosure has been particularly shown and described with reference to preferred embodiments thereof, it is to be understood that the present disclosure is not limited to the specific embodiments thereof, it will be understood that various modifications may be made by those skilled in the art without departing from the spirit and scope of the present disclosure.

What is claimed is:

1. An electronic device having a multi-operating system (OS) executed thereon, the electronic device comprising:
a first memory management module configure to:
make a direct determination of transmission of a memory of a first operating system (OS) to a second operating system (OS) and recovery of the transmitted memory back to the first OS with respect to available memory state of the first and second OS, and
enable a request for execution of the transmission and recovery to the second OS;
a first state collection module configured to:
collect memory availability state information of the first OS, and
collect memory information of the second OS at a designated collecting interval by means of a request to the second OS;
a memory allocation module configured to allocate, for use by the second OS, a dynamic memory of the first OS according to a request from the first OS memory management module;
a second state collection module configured to collect memory availability state information of the second OS; and
a second memory management module configured to either manage a memory of the second OS by receiving a memory of the first OS or return the transmitted memory back to the first memory based on the dynamic memory allocation information collected from the first and second state collection modules.

2. The electronic device of claim 1, wherein the first OS memory management module determines the memory availability state information of the first OS and the second OS, and when the second OS is executed as a main system and the first OS is executed as a sub system, enables a request for transmission to the memory allocation module so that the second OS uses available memory of the first OS, wherein, when the first OS is executed as a main system, the first OS enables a request to the memory allocation module for a recovery of the transmitted memory.

3. The electronic device of claim 2, wherein the first memory management module:

determines transmission of a memory from the first OS to the second OS and a minimum available memory amount according to the determined memory availability state, and
determines either one of the transmission and the recovery of the memory of the first OS transmitted to the second OS based on the determined memory availability state and the minimum available memory amount.

4. The electronic device of claim 3, wherein:
the minimum available memory amount is designated by the first OS as a minimum unit of an available memory amount for executing an application of the first OS,
the first OS enables a request for a recovery of a memory to the second OS according to the designated available memory amount, and
the designated available memory amount is determined according to an average amount used by the application.

5. The electronic device of claim 2, wherein the determining of the transmission or the recovery comprises:
determining whether the first OS transmits the memory to or recovers the memory from the second OS, and enabling a request to the memory allocation module of the second OS according to a result of the determining.

6. The electronic device of claim 2, wherein:
a plurality of first OSes are provided, and
in a distributed computing, the plurality of first OSes determine whether the first memory management module installed in each first OS is to transmit a memory of the first OS to the second OS or recover it back to the first OS.

7. The electronic device of claim 1, wherein:
the collecting interval is determined according to whether the first OS and the second OS approach memory pressure and whether an amount of memory use is varied, and
the first OS executes the first memory management module without waiting until the designated collecting interval when a memory pressure event of the first OS and the second OS occurs.

8. The electronic device of claim 1, wherein the memory allocation module allocates a memory of the first OS to the second OS according to the request of the first OS or executes recovery of the allocated memory to the first OS, and wherein, when the plurality of first OS are provided, the memory allocation module may allocate the memory of the first OS to another one of the first OS.

9. The electronic device of claim 1, wherein:
the second memory state collection module collects memory availability state information of the second OS when state of the second OS changes, and
transmits the information to the first OS upon request for the information of the first OS or transmits memory pressure of the second OS to the first OS when the memory of the second OS is low.

10. The electronic device of claim 1, wherein the first OS is a guest operating system, and the first memory management module and the first state collection module are executed within the guest operating system of a virtual machine, and wherein the second OS is a host operating system, and the second memory management module, the memory allocation module and the second state collection module are executed within the host OS.

11. A method for managing a dynamic memory between a first operating system (OS) and a second OS in an electronic device having multi-operating systems, comprising:

first memory managing operation configured for:
making a direct determination of transmission of a memory of a first operating system (OS) to a second operating system (OS) and recovery of the transmitted memory back to the first OS with respect to available memory state of the first and second OS, and enabling a request for execution of the transmission and recovery to the second OS;
first state collecting operation configured for:
collecting memory availability state information of the first OS, and
collecting memory information of the second OS at a designated collecting interval by means of a request to the second OS;
memory allocating operation configured for allocating, for use by the second OS, a dynamic memory of the first OS according to a request from the first OS memory managing operation;
second state collecting operation configured for collecting memory availability state information of the second OS; and
second memory managing operation configured for either managing a memory of the second OS by receiving a memory of the first OS or returning the transmitted memory back to the first memory based on the dynamic memory allocation information collected from the first and second state collection operations.

12. The method of claim 11, wherein the first memory managing operation comprises determining the memory availability state information of the first OS and the second OS, and when the second OS is executed as a main system and the first OS is executed as a sub system, enabling a requests for transmission so that the second OS uses available memory of the first OS, wherein, when the first OS is executed as a main system, the first OS requests a recovery of the transmitted memory.

13. The method of claim 12, wherein the first memory managing operation comprises:
determining transmission of a memory from the first OS to the second OS and a minimum available memory amount according to the determined memory availability state, and
determining either one of the transmission and the recovery of the memory of the first OS to the second OS based on the determined memory availability state and the minimum available memory amount.

14. The method of claim 13, wherein:
the minimum available memory amount is designated by the first OS as a minimum unit of an available memory amount for executing an application of the first OS,
the first OS enables a request for a recovery of a memory to the second OS according to the designated available memory amount, and
the designated available memory amount is determined according to an average amount used by the application.

15. The method of claim 12, wherein the determining of the transmission or the recovery comprises:
determining whether the first OS transmits the memory to or recovers the memory from the second OS, and enabling a request to the memory allocation module of the second OS according to a result of the determining.

* * * * *